(12) United States Patent
Saito et al.

(10) Patent No.: US 7,398,996 B2
(45) Date of Patent: Jul. 15, 2008

(54) GAS PRODUCER

(75) Inventors: Tetsuo Saito, Himeji (JP); Takayoshi Dosai, Himeji (JP); Akihiko Suehiro, Himeji (JP); Shougo Matono, Ako (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 51 days.

(21) Appl. No.: 10/567,035

(22) PCT Filed: Aug. 6, 2004

(86) PCT No.: PCT/JP2004/011339

§ 371 (c)(1),
(2), (4) Date: Aug. 17, 2006

(87) PCT Pub. No.: WO2005/014345

PCT Pub. Date: Feb. 17, 2005

(65) Prior Publication Data
US 2007/0039508 A1    Feb. 22, 2007

(30) Foreign Application Priority Data
Aug. 6, 2003 (JP) ............................. 2003-287407

(51) Int. Cl.
*B60R 21/26* (2006.01)
(52) U.S. Cl. ...................... 280/741; 280/742
(58) Field of Classification Search ............... 280/736, 280/737, 741, 742
See application file for complete search history.

(56) References Cited
U.S. PATENT DOCUMENTS

| | | | |
|---|---|---|---|
| 6,032,979 A * | 3/2000 | Mossi et al. ............... | 280/741 |
| 6,189,927 B1 * | 2/2001 | Mossi et al. ............... | 280/741 |
| 6,460,884 B1 * | 10/2002 | Nakashima et al. ......... | 280/741 |
| 6,739,621 B2 * | 5/2004 | Parkinson et al. ........... | 280/741 |
| 6,860,510 B2 * | 3/2005 | Ogawa et al. ............... | 280/736 |
| 7,055,855 B2 * | 6/2006 | Nakashima et al. ......... | 280/736 |
| 2004/0195813 A1 * | 10/2004 | Canterberry et al. ........ | 280/741 |
| 2005/0029786 A1 * | 2/2005 | Watase et al. ............... | 280/740 |
| 2005/0225064 A1 * | 10/2005 | Suehiro et al. .............. | 280/741 |
| 2006/0131853 A1 * | 6/2006 | Iwai et al. .................. | 280/736 |
| 2007/0063494 A1 * | 3/2007 | Saito et al. .................. | 280/736 |

FOREIGN PATENT DOCUMENTS

| | | |
|---|---|---|
| JP | 6-183310 | 7/1994 |
| JP | 9-207705 | 8/1997 |
| JP | 2001-97177 | 4/2001 |

OTHER PUBLICATIONS

U.S. Appl. No. 10/567,024, filed Feb. 3, 2006, Saito et al.
U.S. Appl. No. 10/567,035, filed Feb. 3, 2006, Saito et al.

* cited by examiner

*Primary Examiner*—Toan C To
(74) *Attorney, Agent, or Firm*—Oblon, Spivak, McClelland, Maier & Neustadt, P.C.

(57) ABSTRACT

A gas generator is provided with a metal housing constituted by an initiator shell and a closure shell, a combustion chamber which is formed inside the housing and into which gas generants generating a high-temperature gas through combustion are loaded, a filter member disposed around the combustion chamber, an igniter mounted into the housing and igniting and burning the gas generants inside the combustion chamber and a plurality of gas discharge openings formed on the housing and discharging the gas generated in the combustion chamber.

8 Claims, 4 Drawing Sheets

GAS PRODUCER

TECHNICAL FIELD

The present invention relates to a gas generator suitable for inflating an airbag, etc.

BACKGROUND ART

A gas generator which will rapidly inflate and deploy an airbag for protecting a passenger from an impact during a collision of the automobile is installed into an airbag module which is mounted into a steering wheel or an instrument panel. Then, the gas generator allows a squib to ignite through energization of a control unit (actuator) to burn the gas generants by the ignition flame, thereby generating a great amount of gas abruptly.

In conventional gas generators, there are available a two-cylinder type gas generator which is provided with a central space corresponding to an ignition chamber of gas generants and an annular space corresponding to a combustion/filter chamber which is concentrically formed at the external part and in which gas is burnt and cooled or slag is collected. This type of gas generator includes that disclosed in Japanese Published Unexamined Patent Application No. 9-207705 which is shown as an example in FIG. 4. This drawing shows an approximate half of the radial cross section of a short cylindrical gas generator. In this gas generator, a housing structure obtained by placing a two-cylinder-structured upper vessel 51 with a double short-tube-structured lower vessel 54 and subjecting them to friction welding (housing for the gas generator) is used as an ignition chamber P at the central space and used as a combustion chamber G and a filter chamber P at the annular space in the periphery.

A squib 68 and an enhancer 69 are incorporated inside the ignition chamber P from below. Meanwhile, a concaved ring-shaped lid member 66 having a double flange on the cross section is fixed in the combustion chamber G and the filter chamber F by allowing each flange of 66d and 66e to respectively contact with burrs 52b and 53b of an upper vessel 51, and gas generants 57 and a cooling/slag-collecting member 60 are housed radially in sequence into an annular space sandwiched between the lid member 66 and the upper vessel 51, thereby forming the combustion chamber G and the filter chamber F.

Further, ring-shaped cushion members 58 and 59 are set respectively on an upper face 70 and a lower face 71 of the layer of the gas generants 57. In addition, seal members 61 and 62 are respectively set on the upper face and the lower face of the cooling/slag-collecting member 60. Moreover, an aluminum foil member 64 for closing a gas discharging orifice 53a and an aluminum foil member 65 for closing a burning orifice 52a are attached. The above-described constitution makes it possible to provide a gas generator which can sufficiently withstand a rise in inner pressure due to gas generated inside the gas generation chamber G.

However, as shown in FIG. 4, this kind of two-cylinder type gas generator is larger in the number of parts for constituting the gas generator and is complicated in structure. Therefore, some limitations are imposed on reducing the manufacturing cost thereof, while maintaining the safety of the gas generator.

DISCLOSURE OF THE INVENTION

Problems to be Solved by the Invention

An object of the present invention is to provide a gas generator which can be simplified in terms of the structure thereof and also maintain higher safety even when the number of components is reduced.

Means for Solving the Problem and Effects of the Invention

The present invention has the following several features for attaining the object of the invention. In the present invention, the following main features are provided solely or in combination with other parts, whenever necessary.

The gas generator of the present invention is provided with a housing, gas generants, a filter member and an igniter.

The housing is a metal housing constituted by an initiator shell and a closure shell. A combustion chamber is formed inside the housing. The gas generants are loaded into the combustion chamber, generating a high-temperature gas through combustion. A plurality of gas discharge openings are formed in the housing to discharge gas generated in the combustion chamber.

The filter member is disposed around the combustion chamber. The igniter is fitted to the housing to ignite and burn the gas generants in the combustion chamber.

Either or both of the initiator shell and the closure shell constituting the housing are provided with semi-spherical or semi-oval end plate portions and cylindrical portions having a diameter D formed continuously from the end plate portions. The ratio of H/D which is a ratio of the bottom distance H between the end plate portion of the initiator shell and that of the closure shell to the diameter D of the cylindrical portions is in the range from 0.4 to 1.3.

The above-described constitution makes it possible to reduce the number of parts and simplify the structure, thereby making the gas generator smaller in size and significantly reducing the manufacturing cost thereof. Further, even if the gas generator is small in the number of parts and simplified in structure, the housing is prevented from deformation resulting from a rise in the pressure inside the housing due to gas generated through burning of the gas generants inside the combustion chamber. Further, a plurality of gas discharge openings are provided, by which a high-temperature gas discharged from the combustion chamber can be stably supplied.

A/At, which is a ratio of the total sum A of surface areas of the gas generants to the total sum At of opening areas of the gas discharge openings is in the range from 1300 to 2000.

Where the ratio of A/At is out of the above-noted range, gas generants to be used may hardly be burnt. Further, where the ratio is in excess of 2000, the gas generator must be increased in strength, resulting in an increase in cost and weight, which is unfavorable in manufacturing the gas generator or in other aspects.

It is preferable that the gas discharge openings are available in two or more opening diameters.

It is preferable that the gas discharge openings are disposed in a single array or in a plurality of arrays.

It is preferable that the gas discharge openings are available in two different opening diameters (small and large), disposed in two arrays in a zigzag form, and D1/D2, which is a ratio of a small opening diameter D1 of the gas discharge opening to a large opening diameter D2 of the gas discharge opening is in the range from 0.1 to 1.0.

It is preferable that the distance between gas discharge openings d in an axial direction of the housing is related to the small opening diameter D1 and the large opening diameter D2 as follows where the gas discharge openings are disposed in two arrays in a zigzag form.

$$d \geq (D1+D2)/2$$

It is preferable that the gas discharge openings are closed by a rupture member and the rupture member is a metal plate. The metal includes aluminum, steel or stainless steel.

It is preferable that the rupture member thickness is in the range from 0.01 mm to 0.3 mm.

It is preferable that the rupture member is provided so as to be different in strength depending on an opening diameter of the gas discharge openings and the strength of the rupture member is increased with a decrease in diameter of the gas discharge openings.

On the assumption that the strength of the rupture member is increased with a decrease in diameter of the gas discharge openings, $T1/T2=D2/D1$ is obtained when the strength of the rupture member is indicated by the ratio of the opening diameters, where T1 is the strength of the rupture member which is attached to a gas discharge opening having a small diameter D1, T2 is the strength of the rupture member which is attached to a gas discharge opening having a large diameter D2.

In this instance, it is preferable that with regard to the strength of the rupture member each of which is attached to a plurality of gas discharge openings having a different opening diameter, the strength of the rupture member is adjusted in such a way that $T1/T2=D2/D1$ is in the range from 2 to 8.

BEST MODE FOR CARRYING OUT THE INVENTION

Hereinafter, an explanation will be made for embodiments of the gas generator in the present invention with reference to the drawings.

FIG. 1 is a cross-sectional view of the gas generator 30, which is an example of the gas generator of the present invention. In FIG. 1, the gas generator 30 is used to inflate and deploy an airbag and is provided with a housing 3, gas generants 4, a filter member 6 and an igniter 7.

The housing 3 is a metal housing constituted by an initiator shell 1 and a closure shell 2. The metal includes iron, stainless steel, aluminum and steel. A combustion chamber 5 is formed inside the housing 3. The gas generants 4 are loaded into the combustion chamber 5, generating a high-temperature gas through combustion. A plurality of gas discharge openings 8a and 8b are formed in the housing 3 to discharge gas generated in the combustion chamber 5.

The filter member 6 is disposed around the combustion chamber 5. The igniter 7 is fitted to the housing 3 to ignite and burn the gas generants 4 in the combustion chamber 5.

The closure shell 2 is constituted by a cylindrical portion 9 having diameter D, a semi-spherical end plate portion 10 continuously formed from the cylindrical portion 9 and a flange portion 12 extending externally from the cylindrical portion 9. It is preferable that the initiator shell 1 and the closure shell 2 are in the range from 1.5 mm to 3 mm in thickness.

Further, in the housing 3 formed by joining the initiator shell 1 with the closure shell 2, H/D, which is a ratio of the bottom distance H between the end plate portion 14 of the initiator shell 1 and 10 of the closure shell 2 of the diameter D of the cylindrical portions 9 and 13 is usually in the range from 0.4 to 1.3 and preferably from 0.6 to 1.3.

Where the above-described ratio of H/D is less than 0.4, the gas generator may not be assembled due to structural features. Where it exceeds 1.3, it approaches the cylindrical-type gas generators in structure. Therefore, setting the ratio within the above-described range can make the gas generator small in size and also provide strength sufficient for withstanding the pressure due to the gas generated inside the combustion chamber 5.

As shown in FIG. 2, it is preferable that a plurality of gas discharge openings 8a and 8b are formed around the cylindrical portion 9 in a zigzag form. It is also preferable that they are formed in two arrays in a zigzag form. Since the gas discharge openings 8a and 8b are formed in a zigzag form, the gas generated inside the housing 3 is discharged without concentration, thereby preventing damage of a filter member 6. Further, the filter member 6 can be used in a wider area to make an effective use of the filter member 6. These gas discharge openings 8a and 8b are formed not only in a zigzag form but also, for example, in a single array or in a plurality of arrays (two or three arrays) to provide the same effect.

Further, in these gas discharge openings 8a and 8b, (A/At) which is a ratio of the total sum (A) of the surface areas of gas generants 4 to the total sum (At) of the opening areas is usually in excess of 1300 and not more than 2000. Where the ratio (A/At) is not in the above range, the gas generants to be used may hardly be burnt. Where the ratio is in excess of 2000, the gas generator must be increased in strength, resulting in an increase in cost and weight, which is unfavorable in manufacturing the gas generator or in other aspects. Then, in order to attain a stable gas generation in various temperature ranges such as normal temperature, high temperature and low temperature ranges, it is necessary to provide these gas discharge openings 8a and 8b with different opening diameters. It is preferable to provide two or more opening diameters.

The gas discharge openings 8a and 8b of the present embodiment are available in two different opening diameters (small and large) and disposed in two arrays in a zigzag form. D1/D2 which is a ratio of small opening diameter D1 of the small gas discharge opening 8a to large opening diameter D2 of the large gas discharge opening 8b is in the range from 0.1 to 1.0, preferably from 0.2 to 0.8, more preferably from 0.3 to 0.6. These two different openings 8a and 8b (small and large) are related as explained above, thereby making it possible to provide a stable gas generation in each temperature range.

Further, regarding the distance between the above-described two-different sized (small and large) gas discharge openings 8a and 8b, it is preferable that a distance d in an axial direction of the housing 3 is related to the small opening diameter D1 and the large opening diameter D2 as follows.

$$d \geq (D1+D2)/2$$

Therefore, as described above, the gas generated inside the housing 3 is discharged without concentration, thereby securely preventing damage of a filter member 6. Further, the filter member 6 can be used in a wider area to make an effective use of the filter member 6.

In addition, as shown in FIG. 1, these two different-sized (small and large) gas discharge openings 8a and 8b are closed by a band shaped tape rupture member 11 which is made of band shaped aluminum, steel, stainless steel, etc., and attached inside a cylindrical portion 9, by which the space inside the combustion chamber 5 is sealed. The height h of the cylindrical portion 9 is preferably 5 mm or more, more preferably in the range from 5 mm to 30 mm and in particular preferably from 10 mm to 30 mm. Therefore, a band shaped tape can be used as the rupture member 11 and also the rupture member 11 can be easily and securely attached thereto.

Therefore, the rupture member 11 is preferably in the range from 0.01 mm to 0.3 mm in thickness. Further, such is provided so as to be different in strength depending on the diameter of the two different-sized (small and large) gas discharge openings 8a and 8b. More specifically, it is preferable that the rupture member 11 is increased in strength with a decrease in diameter of the gas discharge openings.

On the assumption that the strength of the rupture member is increased with a decrease in diameter of the gas discharge openings, $T1/T2=D2/D1$ can be obtained when the strength of the rupture member is indicated by the ratio of the opening diameter, where $T1$ is the strength of the rupture member which is attached to a gas discharge opening having a small diameter $D1$, $T2$ is the strength of the rupture member which is attached to a gas discharge opening having a large diameter $D2$.

In this instance, it is preferable that with regard to the strength of the rupture member 11 each of which is attached to a plurality of gas discharge openings 8a and 8b having a different opening diameter, the strength of the rupture member 11 is adjusted in such a way that $T1/T2=D2/D1$ is in the range from 2 to 8, preferably from 2.5 to 7 and more preferably from 3 to 5.

As explained above, the rupture member 11 is attached, with the strength adjusted according to the diameter of the gas discharge openings 8a and 8b, thereby making it possible to reduce a difference in gas generation performance in each temperature range.

As shown in FIG. 3, $d1/d2$ which is a ratio of the short axis $d1$ of the end plate portion 10 to the long axis $d2$ is preferably in a range from 1 to 0.02 and more preferably from 1 to 0.1. Where the ratio is in the above range, the gas generator makes it possible to sufficiently withstand an inner pressure resulting from the gas generated inside the gas generator. Further, the end plate portion 10 is available in a semi-spherical shape having a curvature radius R and the ratio of the diameter D of the cylindrical portion 9 to the curvature radius R is preferably in the range from 0.3 to 2 and more preferably from 0.9 to 2.

Therefore, the gas generator is made small in size. As explained above, the end plate portion is available in a semi-spherical shape or a semi-oval shape, thereby making it possible to remove a part on which pressure of the gas generated in the combustion chamber 5 concentrates. Therefore, the gas generator can be constituted of a smaller number of parts, rendering the deformation of the housing to a minimum during gas generation, even if simply constructed.

As with the above-described closure shell 2, the initiator shell 1 which is joined to the closure shell 2 by pressure contact or welding is constituted by a cylindrical portion 13 and a semi- spherical end plate portion 14 formed continuously from the cylindrical portion 13. Then, an igniter 7 is provided at the center of the end plate portion 14.

As with the end plate portion 10 of the closure shell 2, in the end plate portion 14 of the initiator shell 1, $d1/d2$ which is a ratio of the short axis $d1$ to the long axis $d2$ is preferably in the range from 1 to 0.02 and more preferably from 1 to 0.1. Therefore, when the initiator shell 1 is joined with the closure shell 2 in an integral form, it makes it possible to form an approximately spherical or an approximately oval housing 3.

As shown in FIG. 1, an igniter 7 provided at the center of the end plat eportion 14 is constituted by a closed-end inner cylindrical body 16 having a plurality of enhancer openings 15 in the periphery, an enhancer 17 loaded into the inner cylindrical body 16 and a squib 18 mounted so as to be in contact with the enhancer 17.

The inner cylindrical body 16 is fixed to an igniter holder 19 by crimping or any other appropriate method. Then, the inner cylindrical body 16 is fixed to the initiator shell 1 through fixture of the igniter holder 19 to the end plate portion 14 by welding or any other appropriate method. Further, the inner cylindrical body 16 is of a long-cylindrical shape extending from one end of the combustion chamber 5 formed inside the housing 3 to an approximate center of the combustion chamber 5. A plurality of enhancer openings 15 are formed in the periphery in a long-opening shape along the axial direction of the inner cylindrical body 16. These enhancer openings 15 are formed in a zigzag form so that those disposed adjacent to each other along the axial direction of the inner cylindrical body 16 are not provided in parallel as shown in FIG. 1. Therefore, a heat current spouted from the igniter 7 is effectively spouted into the whole part of the combustion chamber 5. Further, these enhancer openings 15 may be of a round-opening shape, in addition to the long-opening shape. They do not need to be provided in a zigzag form.

A filter member 6 disposed around the combustion chamber 5 is provided along the inner wall of the cylindrical portions 9 and 13 inside the housing 3 constituted by the closure shell 2 and the initiator shell 1. The filter member 6, for example, is manufactured inexpensively by forming annularly bulk materials of metal wires or metal windings such as plain stitch wire netting, square-weave wire netting and crimped wire netting. The filter member 6 is pressed to the inner wall side of the housing 3 by presser members 20 and 21 respectively provided on inner faces of the end plate portions 10 and 14 of the closure shell 2 and the initiator shell 1.

Gas generants 4 are loaded into an inner circumference of the filter member 6. Then, these gas generants 4 are burnt by a heat current from the igniter 7 in the combustion chamber 5

The gas generants 4 loaded into the combustion chamber 5 are non-azide compositions, and thosemade of fuels, oxidizers and additives (binder, slag-forming agent and combustion-adjusting agent) may be used.

Fuels which can be utilized include, for example, nitrogen-containing compounds. Nitrogen-containing compounds include one or more types of mixtures selected from triazole derivatives, tetrazole derivatives, guanidine derivatives, azodicarbon amide derivatives, hydrazine derivatives, urea derivatives and ammine complexes.

Triazole derivatives include, for example, 5-oxo-1,2,4-triazole and amino triazole. Tetrazole derivatives include, for example, tetrazole, 5-aminotetrazole, aminotetrazole nitrate, nitroaminotetrazole, 5,5'-bi-1H-tetrazole, 5,5'-bi-1H-tetrazole diammonium salt, 5,5'-azotetrazole diguanidium salt.

Guanidine derivatives include, for example, guanidine, nitroguanidine, cyanoguanidine, triaminoguanidine nitrate, guanidine nitrate, aminoguanidine nitrate and guanidine carbonate. Azodicarbonamide derivatives include, for example, azodicarbonamide. Hydrazine derivatives include, for example, carbohydrazide, carbohydrazide nitrate complex, dihydrazide oxalate and hydrazine nitrate complex. Urea derivatives include, for example, biurets. Ammine complexes include hexaammine copper complex, hexaammine cobalt complex, tetraammine copper complex and tetraammine zinc complex.

Of these nitrogen-containing compounds, one or more types of compounds selected from tetrazole derivatives and guanidine derivatives are preferable, and nitroguanidine, guanidine nitrate, cyanoguanidine, 5-aminotetrazole, aminoguanidine nitrate and guanidine carbonate are particularly preferable.

These nitrogen-containing compounds in the gas generants 4 are different in mixture ratio, depending on the number of carbon atoms, hydrogen atoms and other atoms to be oxidized in the molecular formulae, preferably in the range from 20% by weight to 70% by weight and in particular preferably in the range from 30% by weight to 60% by weight. Further, the nitrogen-containing compounds are different in absolute value of the mixture ratio, depending on types of oxidizer to be added to gas generants. However, the concentration of trace amounts of CO in generated gas will increase where an absolute value of the mixture ratio in the nitrogen-containing compounds is greater than a total oxidation theoretical amount. In contrast, the concentration of trace amount NOx in the generated gas will increase where an absolute value of the mixture ratio in the nitrogen-containing compounds is equal to or lower than a total oxidation theoretical amount. Therefore, most preferable such is in a range in which both of them are optimally balanced.

Preferable oxidizers include those at least selected from one type of cation-containing nitrates, nitrites and perchlorates selected from alkaline metals, alkaline earth metals, transition metals and ammonium. Also usable are oxidizers other than nitrates, namely, nitrites and perchlorates which are frequently used in an airbag inflator field. However, they will decrease in terms of the number of oxygen atoms in the nitrite molecules as compared with nitrate molecules or may reduce the production of fine powder mist easily discharged outside the bag, and therefore nitrates are preferable. Nitrates include, for example, sodium nitrate, potassium nitrate, magnesium nitrate, strontium nitrate, phase stable ammonium nitrate and basic copper nitrate. Preferable are strontium nitrate, phase stable ammonium nitrate and basic copper nitrate.

A mixture ratio of oxidizers in the gas generants 4 is different in absolute value, depending on types and quantities of nitrogen-containing compounds to be used, and preferably in the range from 30% by weight to 80% by weight. The ratio is in particular preferably in the range from 40% by weight to 75% by weight, taking into consideration the concentrations of the above-described CO and NOx.

Any binders may be usable as an additive as long as they do not significantly affect a combustion behavior of gas generants. Binders include, for example, organic binders such as metallic salts of carboxymethylcellulose, methylcellulose, hydroxyethylcellulose, cellulose acetate, cellulose propionate, cellulose acetate butyrate, nitrocellulose, microcrystalline cellulose, guar gum, polyvinyl alcohol, polyacrylamide, polysaccharide derivatives (e.g., starch) and stearate as well as inorganic binders such as molybdenum disulfide, synthetic hydroxytalcite, acid clay, talc, bentonite, diatomaceous earth, kaolin, silica and alumina.

A mixture ratio of binders is preferably in the range from 0% by weight to 10% by weight for press molding and from 2% by weight to 15% by weight for extrusion molding. Molded articles will increase in breaking strength with an increase in the added quantity of binders. However, when the number of carbon atoms and hydrogen atoms in the compositions is increased and the concentration of trace amount CO gas which is an incomplete combustion product of carbon atom is elevated, the quality of generated gas is affected. It is preferable to use binders in a minimum quantity because they may inhibit burning of gas generants. In particular, the quantity of binders exceeding 15% by weight may require a relatively larger quantity of oxidizers to reduce a relative percentage of fuels, thereby making it difficult to provide a practicable gas generator system.

Further, slag-forming agents may be added as compositions other than binders. Slag-forming agents are added to facilitate filtration of a filter member 6 inside the gas generator 30 through interactions with metallic oxides in particular coming from oxidizer compositions in gas generants.

Slag-forming agents include natural clays mainly made with alumino silicate such as silicon nitride, silicon carbide, acid clay, silica, bentonite and kaolin, synthetic clays such as synthetic mica, synthetic kaolinite and synthetic smectite and those selected from talc which is a type of hydrous magnesium silicate mineral, etc. Of these materials, acid clay and silica are preferable and acid clay is particularly preferable. A mixture ratio of slag-forming agents is preferably in the range from 0% by weight to 20% by weight and particularly preferably from 2% by weight to 10% by weight. An excessively large quantity of agents will reduce the linear burning velocity or gas generation efficiency, while an excessively small quantity will not provide a full slag-forming function.

Preferable combinations of gas generants 4 are gas generants which contain 5-aminotetrazole, strontium nitrate, synthetic hydrotalcite and silicon nitride, and those which contain guanidine nitrate, strontium nitrate, basic copper nitrate and acid clay.

Combustion-adjusting agents may also be added, whenever necessary. Combustion-adjusting agents include explosive compounds such as metallic oxide, ferrosilicon, activated carbon, graphite, hexogen, octogen and 5-oxo-3-nitro-1,2,4-triazole. A mixture ratio of combustion-adjusting agents is preferably in the range from 0% by weight to 20% by weight, and particularly preferably from 2% by weight to 10% by weight. An excessively large quantity of agents will reduce the gas generation efficiency, while an excessively small quantity will not provide a sufficient burning velocity.

The above-described gas generants 4 are preferably molded articles by press molding or extrusion molding and most preferably by extrusion molding. They may be available, for example, in the shape of a pellet (corresponding to one form of tablets generally found in drugs), circular column, tube, disk or hollow body with both ends closed. The tubular shape includes a cylindrical shape, and the cylindrical shape includes a single-pore cylindrical shape and a porous cylindrical shape. The hollow body shape with both ends closed includes a cylindrical shape with both ends closed. Further a state in which molded articles of gas generants 4 with both ends closed means a state in which pores opened at both ends are closed by two forces coming from the outside to the inside. The pores may be available either in a completely closed state or an incompletely closed state.

An explanation will be made for how to manufacture hollow-body-shaped gas generants 4 with both ends closed. The above-described non-azide based compositions made with a nitrogen-containing compound, an oxidizer, a slag-forming agent and a binder are at first mixed by using a V-type mixer, a ball mill, etc. Then, the resultant is mixed, with water or a solvent (for example, ethanol) added, to obtain a bulk ingredient in a wet state. In this instance, the wet state means a state having plasticity to some extent in which water or a solvent is contained preferably in the range from 10% by weight to 25% by weight and more preferably from 13% by weight to 18% by weight. Thereafter, the wet bulk ingredient is, as it is, processed by using an extruder (for example, that equipped with a dice or an inner hole pin at the exit) to obtain extrusion-molded hollow cylindrical molded articles, the outer diameter of which is preferably in the range from 1.4 mm to 4 mm and more preferably from 1.5 mm to 3.5 mm and the inner diameter of which is preferably in the range from 0.3 mm to 1.2 mm and more preferably from 0.5 mm to 1.2 mm.

Thereafter, the extrusion-molded hollow cylindrical molded articles are subjected to a pressing treatment at a uniform interval to obtain cylindrical molded articles with both ends closed. Usually, the hollow cylindrical molded articles are subjected to pressing treatment at a uniform interval and then cut off by folding them at the respectively closed recesses. Thereafter, they are dried at two stages, namely, usually in the range from 50° C. to 60° C. for 4 hours to 10 hours and then, usually in the range from 105° C. to 120° C. for 6 hours to 10 hours, thereby making it possible to obtain cylindrical shaped gas generants which have a space therein, with the ends closed. The thus obtained gas generants are usually in the range from 1.5 mm to 8 mm in length, preferably from 1.5 mm to 7 mm and more preferably from 2 mm 6.5 mm.

Further, the gas generants 4 are determined for linear burning velocity under constant pressure conditions. The determination is empirically performed according to the following Vielle's formula.

$$r = aP^n$$

wherein r denotes linear burning velocity; a, constant number; P, pressure; n, pressure exponent. The pressure exponent of n denotes a slope obtained by logarithmic plotting of X axis pressure in relation to the exponent of Y axis burning velocity.

A linear burning velocity of the gas generants used in the gas generator of the present embodiment is preferably in the range from 3 mm/second to 60 mm/second under 70 kgf/cm² and more preferably from 5 mm/second to 35 mm/second. Further, the pressure exponent is preferably in the range of $n=0.90$ or lower, more preferably $n=0.75$ or lower, furthermore preferably $n=0.60$ or lower, and particular preferably in the range from $n=0.60$ to $n=0.30$.

General methods for determining the linear burning velocity include a strand burner method, a compact motor method and a sealed pressure vessel method. More specificically, a test piece obtained by coating a restrictor on the surface after being molded to a predetermined size by press molding is used to determine the burning velocity in a high-pressure vessel by a fuse cutting method, etc. In this instance, the linear burning velocity is determined by referring to the pressure inside the high pressure vessel as a variable and the pressure exponent is determined in accordance with Vielle's formula above.

Since preferable gas generants are non-azide gas generants, raw materials used are less harmful to humans. Further, a proper selection of fuel components and oxidizer components can reduce the heating value per mole of generated gas, making the gas generator smaller in size and lighter in weight.

Enhancers 17 to be mounted into an inner cylindrical body 16 include those in which the generally-available following compositions are contained. More specifically, they are metal powders such as $B/KNO_3$, oxidizer-containing compositions, compositions which contain nitrogen-containing compounds/oxidizers/metal powders and compositions similar to the above-described gas generants 11. The nitrogen-containing compounds include those which can be used as fuel components of the gas generants (such as aminotetrazole and guanidine nitrate). The oxidizers include, for example, nitrates such as potassium nitrate, sodium nitrate and strontium nitrate.

The metal powders include, for example, boron, magnesium, aluminum, magnalium (alloy of magnesium with aluminum), titanium, zirconium and tungsten. Preferable combinations are metal powders which contain 5-aminotetrazole, potassium nitrate and boron and those which contain guanidine nitrate, potassium nitrate and boron. Molding binders usable as gas generants may be contained in the range from 0% by weight to 10% by weight, whenever necessary.

Further, the enhancers 17 are available in the shape of a grain, granule, pellet (corresponding to a form of tablets generally found in drugs), circular column, tube or disk, etc. The tubular shape includes, for example, a cylindrical shape, and the cylindrical shape includes, for example, a single-pore cylindrical shape and a porous cylindrical shape. They are manufactured by utilizing a powder mixture, granulation method (granulation by agitation, granulation by spray drying, extrusion granulation, rolling granulation and compression granulation) and tablet compression.

Further, a cushion member 22 is provided at an end plate portion 10 of the closure shell 2 on the combustion chamber 5. The cushion member 22 is made of, for example, ceramic fiber or silicon foam, acting to prevent breakage of the gas generants 4 loaded inside the combustion chamber 5 such as cracks resulting from vibration.

The gas generator 30 of the present embodiment is a single-cylinder type gas generator and mainly used as a gas generator for inflating an airbag for a front passenger seat of the automobile. A bottom distance H between the end plate portions 14 and 10 is preferably in the range from 45 mm to 90 mm. The gas generator is installed into an airbag module which is to be fitted into an instrument panel on the front passenger seat. Then, an igniter 7 of the gas generator 30 is connected to a connector on the automobile (not illustrated). The gas generator may also be used for a driver's seat. A two-cylinder type gas generator can also be installed into an airbag module.

The gas generator of the present embodiment makes it possible to load the gas generants in a similar quantity as that used in a conventional gas generator, even when the gas generator is reduced in size and weight, generating the gas in a similar quantity as a conventional gas generator. The present gas generator can be made smaller in size and lighter in weight while maintaining gas generation in a similar quantity as that of a conventional gas generator, because the end plate portions 14 and 10 are formed on the housing to remove a part on which pressure concentrates inside the housing, thereby making it possible to sufficiently withstand a high pressure and also keep deformation of the housing to a minimum upon gas generation.

As explained above, in an airbag module 30 connected to the automobile, for example, where a collision sensor detects a collision of the automobile, a squib ignition circuit connected to an igniter 7 allows the igniter 7 to function (electrified ignition), thereby burning gas generants 4 in a combustion chamber 5 to generate a high-temperature gas. At this time, the pressure rises inside the combustion chamber 5. However, since the housing 3 is in an approximately spherical shape, it is sufficiently strong to withstand the pressure rise inside the combustion chamber 5 and remarkably small in deformation.

Therefore, a high-temperature gas generated inside the combustion chamber 5 is carried through a filter member 6 and discharged from gas discharge openings 8a and 8b after breakage of a rupture member 11. When the high-temperature gas is carried through the filter member 6, the gas is cooled and residue is collected. Further, the filter member 6 is provided substantially across the combustion chamber 5, resulting in an effective use of the filter member 6. It is, thus, possible to discharge the gas which is sufficiently cooled and from which residue is sufficiently collected.

In addition, the gas discharge openings 8a and 8b are formed at a different opening diameter and are closed with rupture members which are different in terms of strength, thereby making it possible to provide stable gas generation characteristics at various temperature ranges such as normal temperature, low temperature and high temperature ranges.

REFERENCE EXAMPLE 1

(An example of manufacturing hollow-body shaped gas generants having both closed ends which are used in the gas generator of the present embodiment)

Ethanol 3% by weight and water 13% by weight are added to a mixture of guanidine nitrate 43.5% by weight, strontium nitrate 25% by weight, basic copper nitrate 25% by weight, acid clay 2.5% by weight and polyacrylamide 4% by weight, and the resultant is mixed and kneaded to obtain a mixed mass, which is then extruded at a pressure of 8 Mpa by using an extruder equipped with a dice having an inner diameter of 2 mm and an inner hole pin having an outer diameter of 0.5 mm at the exit. The thus prepared bar-like molded article is fed between molding gears, while taken up by using a feed belt, and provided with recesses at a space of 4.4 mm by male teeth of the molding gear. The article is cut off by folding it at the recesses, dried for 8 hours at 55° C. and further dried for 8 hours at 110° C. to obtain gas generants.

In the present invention has been described in the above-described preferred embodiments but is not restricted only thereto. It is to be understood that variations may be made without departing from the spirit and scope of the present invention.

DESCRIPTION OF SYMBOLS

Figure 1:
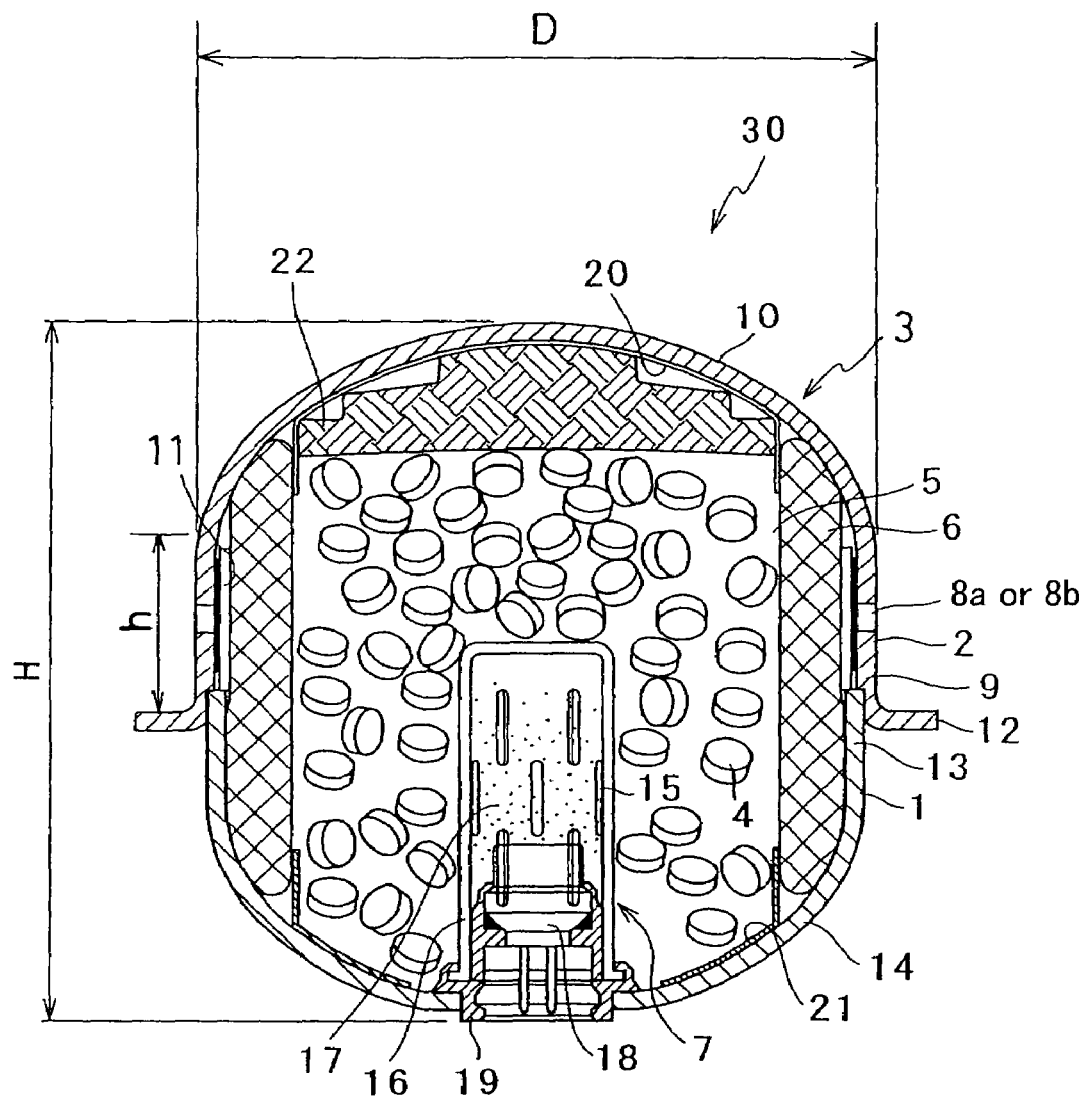
FIG. 1 is a cross-sectional view showing one example of the gas generator of the present embodiment.
Figure 2:
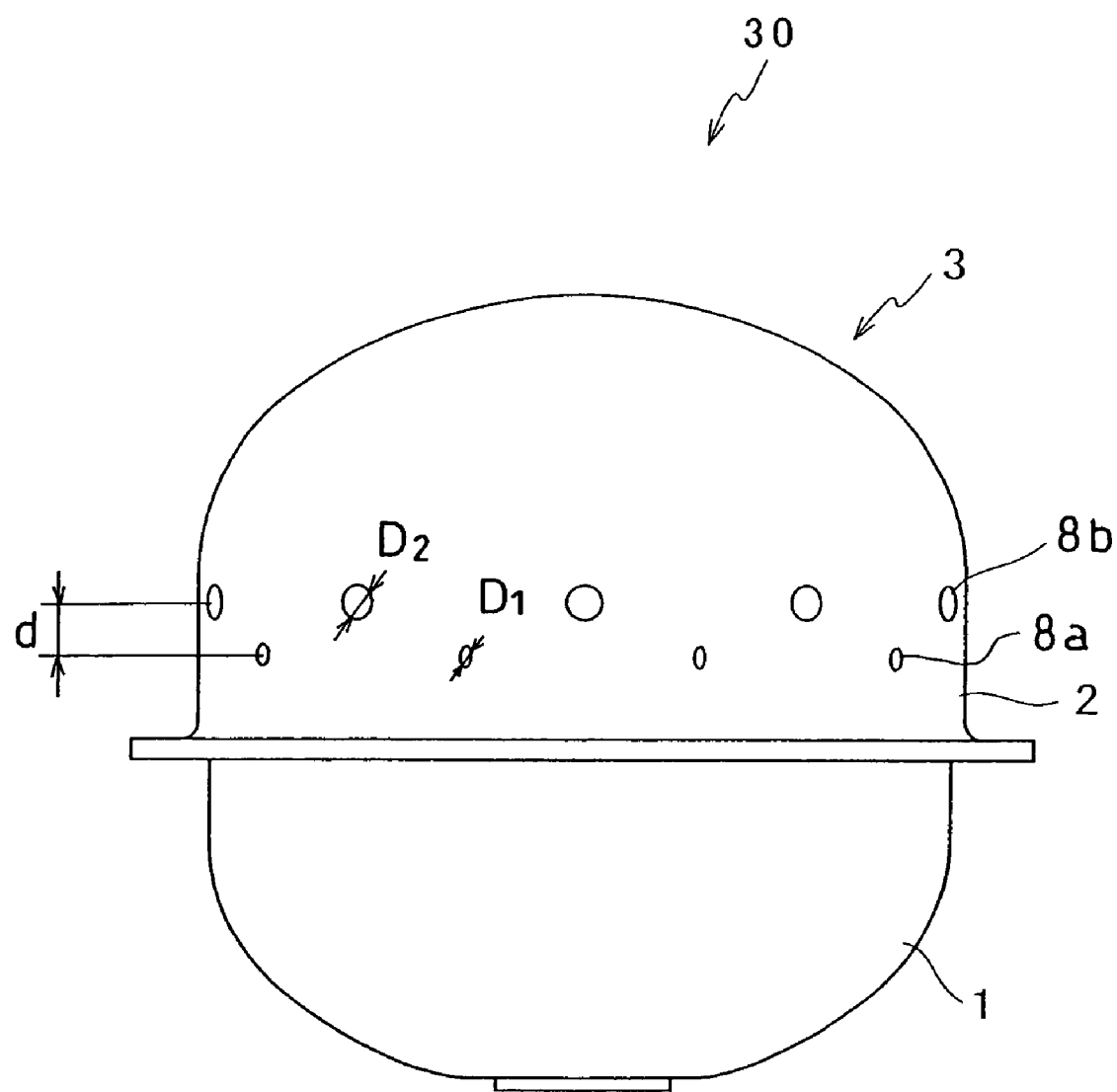
FIG. 2 is an outline drawing of the gas generator of the present embodiment.
Figure 3:
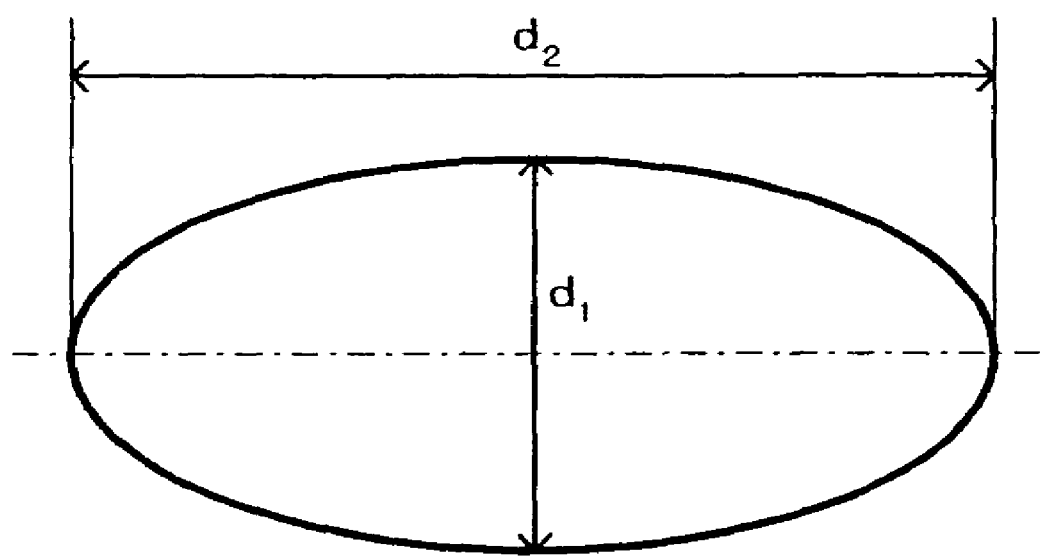
FIG. 3 is a drawing showing the short axis d1 and the long axis d2 at the end plate portion of the gas generator of the present embodiment.
Figure 4:
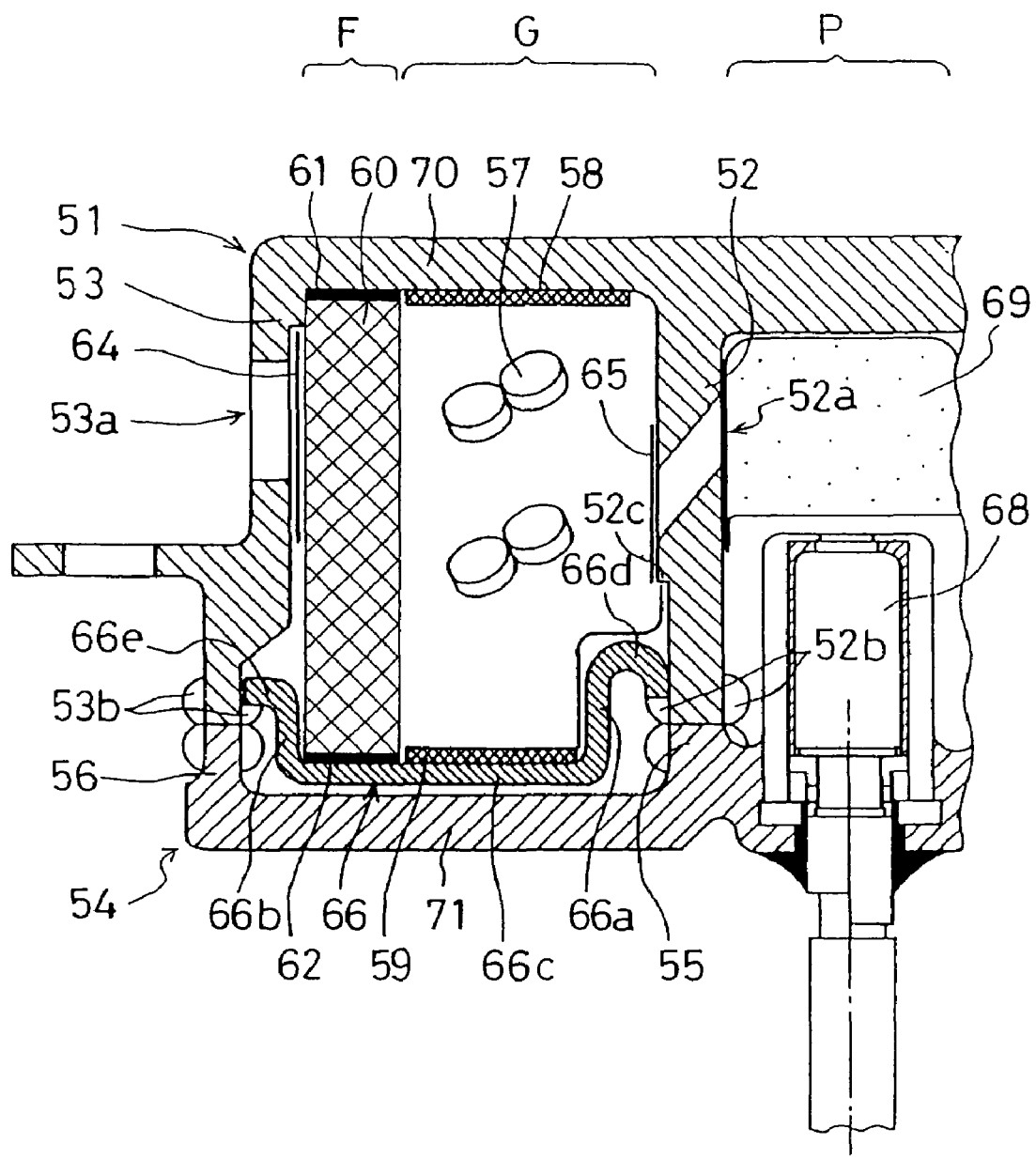
FIG. 4 is a cross-sectional view showing one example of a conventional two-cylinder type gas generator.

In the present invention the following symbols and reference numbers are utilized:

D: Diameter
H: Bottom distance
h: Length of cylindrical portion
d: Distance between openings
D1: Small opening diameter
D2: Large opening diameter
1: Initiator shell
2: Closure shell
3: Housing
4: Gas generants
5: Combustion chamber
6: Filter member
7: Igniter
8a: Small-diameter gas discharge opening
8b: Large-diameter gas discharge opening
9: Cylindrical portion
10: End Plate portion
11: Rupture member
12: Flange portion
13: Cylindrical portion
14: End plate portion
15: Enhancer opening
16: Inner cylindrical body
17: Enhancer
18: Squib
19: Igniter holder
20, 21: Presser member
22: Cushion member
30: Gas generator

What is claimed is:

1. A gas generator comprising:
   a metal housing constituted by an initiator shell and a closure shell,
   a combustion chamber which is formed inside the housing and into which gas generants generating a high-temperature gas through combustion are loaded,
   a filter member disposed around the combustion chamber,
   an igniter mounted into the housing and igniting and burning the gas generants inside the combustion chamber, and
   a plurality of gas discharge openings formed on the housing and discharging the gas generated in the combustion chamber, wherein either or both of the initiator shell and the closure shell constituting the housing are provided with semi-spherical or semi-oval end plate portions and cylindrical portions having a diameter D continuously formed from said end plate portions, a ratio H/D of the bottom distance H between the end plate portion of the initiator shell and that of the closure shell to the diameter D of the cylindrical portions is in the range from 0.4 to 1.3, and a ratio A/At of a total sum (A) of surface areas of gas generants to the total sum (At) of the opening areas of the gas discharge openings is in excess of 1300 and not more than 2000,
   wherein the gas discharge openings have first and second opening diameters (D1, D2) and are disposed in two arrays in a zigzag form, the first opening diameter (D1) being smaller than the second opening diameter D2, and
   wherein a relation of a distance d between gas discharge openings in an axial direction of the housing, the first opening diameter (D1), and the second opening diameter (D2) is represented by $d \geq (D1+D2)/2$.

2. A gas generator according to claim 1, wherein the gas discharge openings comprise two or more opening diameters.

3. A gas generator according to claim 1, wherein the gas discharge openings are disposed in a single array or in a plurality of arrays.

4. A gas generator according to claim 1, wherein a ratio D1/D2 is in a range of from 0.1 to 1.0.

5. A gas generator according to claim 1, which comprises a rupture member wherein the gas discharge openings are closed by said rupture member and said rupture member comprises a metal plate made of aluminum, steel or stainless steel.

6. A gas generator according to claim 5, wherein said rupture member is in a range from 0.01 mm to 0.3 mm in thickness.

7. A gas generator according to claim 5, wherein said rupture member is provided so as to be different in strength depending on an opening diameter of the gas discharge openings and a strength level of the rupture member is increased corresponding with a decrease in diameter of the gas discharge openings.

8. A gas generator according to claim 5, wherein with respect to a strength level of said rupture member which is attached to each of a plurality of gas discharge openings having a different opening diameter, the strength level of the rupture member is adjustable such that T1/T2=D2/D1 and is in the range of from 2 to 8 when T1/T2=D2/D1, wherein T1 is a strength of value said rupture member which is attached to a gas discharge opening having said first opening diameter D1, T2 is a strength of value said rupture member which is attached to a gas discharge opening having said second opening diameter D2.

* * * * *